(12) United States Patent
Crews

(10) Patent No.: US 9,938,451 B2
(45) Date of Patent: Apr. 10, 2018

(54) ENHANCED ELECTROLYTIC DEGRADATION OF CONTROLLED ELECTROLYTIC MATERIAL

(71) Applicant: James B. Crews, Houston, TX (US)

(72) Inventor: James B. Crews, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 26 days.

(21) Appl. No.: 14/862,310

(22) Filed: Sep. 23, 2015

(65) Prior Publication Data

US 2016/0009986 A1 Jan. 14, 2016

Related U.S. Application Data

(62) Division of application No. 13/291,530, filed on Nov. 8, 2011, now Pat. No. 9,187,686.

(51) Int. Cl.
*C09K 8/52* (2006.01)
*C09K 8/72* (2006.01)
*E21B 29/00* (2006.01)

(52) U.S. Cl.
CPC .............. *C09K 8/72* (2013.01); *C09K 8/52* (2013.01); *E21B 29/00* (2013.01)

(58) Field of Classification Search
CPC .............. C09K 8/52; C09K 8/72; E21B 29/00
See application file for complete search history.

(56) References Cited

U.S. PATENT DOCUMENTS

| | | | | |
|---|---|---|---|---|
| 3,630,285 A * | 12/1971 | Claytor, Jr. | ............... | C09K 8/72 166/300 |
| 3,828,854 A * | 8/1974 | Templeton | ............. | C09K 8/845 166/278 |
| 4,157,732 A | 6/1979 | Fonner | | |
| 4,536,302 A | 8/1985 | Augsburger et al. | | |
| 5,067,566 A | 11/1991 | Dawson | | |
| 7,084,093 B2 | 8/2006 | Crews | | |
| 7,160,842 B2 | 1/2007 | Crews | | |
| 2005/0205265 A1 | 9/2005 | Todd et al. | | |
| 2008/0149345 A1* | 6/2008 | Marya | ..................... | E21B 23/00 166/376 |
| 2008/0272342 A1 | 11/2008 | Guzmann et al. | | |
| 2009/0169422 A1 | 7/2009 | Hartley et al. | | |
| 2010/0200235 A1 | 8/2010 | Luo et al. | | |
| 2010/0270031 A1 | 10/2010 | Patel | | |
| 2011/0186306 A1 | 8/2011 | Marya et al. | | |
| 2012/0318513 A1* | 12/2012 | Mazyar | ..................... | C25D 5/48 166/304 |
| 2013/0029886 A1* | 1/2013 | Mazyar | ..................... | C09K 8/54 507/270 |
| 2013/0032357 A1* | 2/2013 | Mazyar | ................... | E21B 41/00 166/376 |

OTHER PUBLICATIONS

Bentonite Clay Composition Product on Alibaba.com obtained May 17, 2014, 7 pages.*
Albert L. Lehninger, "The Molecular Basis Of Cell Structure and Function", Biochemistry, Second Edition, The Johns Hopkins University School Of Medicine; Copyright 1970, 1975 by Worth Publishers, Inc., pp. 254-255.
International Preliminary Report on Patentability for related PCT Application No. PCT/US2012/061106, dated Mar. 14, 2013, pp. 1-10.
International Search Report for related PCT Application No. PCT/US2012/061106, dated Mar. 14, 2013, pp. 1-3.
Retrieved from the Internet http://www.icb.ufmg.brf/~lbcd/cromatina/Lehninger/lehn09.pdf, "Carbohydrates and Glycobiolgy", Chapter 9, Retrieved Jan. 16, 2012; pp. 293-324.
Written Opinion for related PCT Application No. PCT/US2012/061106, dated Mar. 14, 2013, pp. 1-9.

* cited by examiner

*Primary Examiner* — Alicia Bland
(74) *Attorney, Agent, or Firm* — Cantor Colburn LLP

(57) ABSTRACT

A method for degrading a downhole article includes exposing the downhole article to a composition comprising a corrosive agent selected from an ester, aminocarboxylic acid, or a combination thereof. The method also includes contacting the downhole article with the corrosive agent to degrade the downhole article. Additionally, a composition for degrading a downhole article includes water, salt, and a corrosive agent selected from a reducing sugar, ester, aminocarboxylic acid, or a combination thereof.

23 Claims, No Drawings

ENHANCED ELECTROLYTIC DEGRADATION OF CONTROLLED ELECTROLYTIC MATERIAL

CROSS REFERENCE TO RELATED APPLICATIONS

This application is a divisional of U.S. application Ser. No. 13/291,530 filed Nov. 8, 2011, the disclosure of which is incorporated by reference herein in its entirety.

BACKGROUND

Oil and natural gas wells often utilize borehole components or tools that, due to their function, are only required to have limited service lives that are considerably less than the service life of the well. After a component or tool service function is complete, the downhole component or tool must be removed or disposed of in order to recover the original size of the fluid pathway for use, including hydrocarbon production, $CO_2$ sequestration, etc. Disposal of components or tools has conventionally been done by milling or drilling the component or tool out of the borehole, which is generally a time consuming and expensive operation.

In order to eliminate the need for the milling or drilling operation, the removal of components or tools by dissolution of degradable material using various borehole fluids has been proposed. The degradable materials that have been proposed include certain degradable metal alloys formed from reactive metals, such as aluminum, together with other alloy constituents, such as gallium, indium, bismuth, tin, and mixtures and combinations thereof. These materials may be formed by melting powders of the constituents and then solidifying the melt to form the alloy. They may also be formed using powder metallurgy by pressing, compacting, sintering and the like a powder mixture of a reactive metal and other alloy constituent in the various amounts. To degrade the metal alloys, and thus effectively remove the component or tool from the borehole, strong mineral acids or brine has been used. However, the corrosion rate of mineral acids may be too fast while the corrosion rate brine may be too slow under downhole conditions.

Advances that avoid the above noted problems would be well received in the art.

BRIEF DESCRIPTION

Disclosed herein is a method for degrading a downhole article, comprising: exposing the downhole article to a composition comprising a corrosive agent selected from an ester, aminocarboxylic acid, or a combination thereof; and contacting the downhole article with the corrosive agent to degrade the downhole article.

Also disclosed is a method for degrading a downhole article, comprising: introducing a composition comprising an ester, aminocarboxylic acid, or combination thereof into a borehole; and removing, by the composition, a metal from the downhole article to degrade the downhole article.

Further disclosed is a composition for degrading a downhole article, comprising: water; salt; and a corrosive agent selected from a reducing sugar, ester, aminocarboxylic acid, or a combination thereof.

DETAILED DESCRIPTION

A detailed description of one or more embodiments of the disclosed method is presented herein by way of exemplification and not limitation.

The inventor has discovered that a corrosive agent such as a reducing sugar, ester, and aminocarboxylic acid selectively and controllably degrades a downhole article containing certain electrolytic materials so that the downhole article will no longer substantially block or impede a passage or fluid flow in a borehole. Moreover, such degradation by the corrosive agent can expose a surface or feature of a downhole article that was previously covered or protected by a material including an electrolytic material, and the newly exposed surface or feature can provide a benefit for operating in the downhole environment. Further, the inventor has discovered that such degradation of the downhole article can be controlled over time. The corrosion agent is environmentally benign and is corrosive to electrolytic materials over a large temperature range where other compounds are either too corrosive (for example, mineral acids such as hydrochloric acid) or not corrosive enough (for example, brine solutions). These corrosive agents bridge the gap between the corrosion strengths of strong and mild corrosives, such as hydrochloric acid and sodium chloride aqueous solutions.

According to an embodiment, a degradable downhole article, such as a packer, ball seat, frac plug, proppant, or cement includes an electrolytic material, which dissolves in a corrosive environment. Such electrolytic material is referred to herein as controlled electrolytic material (CEM). The controlled electrolytic material, which is discussed further below, can be an electrolytic metal such as described in U.S. patent application Ser. No. 13/194,271, the content of which is incorporated herein by reference in its entirety. Removal of the electrolytic material from the downhole article causes degradation of the downhole article.

In an embodiment, a method for degrading a downhole controlled electrolytic material (CEM) article includes exposing the downhole CEM article to a composition that comprises a corrosive agent and contacting the downhole article with the corrosive agent to degrade the downhole CEM article. The corrosive agent can be a reducing sugar, ester, aminocarboxylic acid, or a combination thereof.

The downhole CEM article comprises a metal selected from Group 2, Group 3, Group 4, Group 5, Group 6, Group 7, Group 8, Group 9, Group 10, Group 11, Group 12, Group 13, lanthanoid series, actinoid series of the periodic table, or a combination thereof. In an embodiment, the metal is, aluminum (Al), calcium (Ca), cobalt (Co), copper (Cu), chromium (Cr), gallium (Ga), indium, (In), iron (Fe), magnesium (Mg), manganese (Mn), molybdenum (Mo), nickel (Ni), palladium (Pd), tungsten (W), silicon (Si), silver (Ag), tin (Sn), titanium, (Ti), vanadium (V), yttrium (Y), zinc (Zn), zirconium (Zr), an alloy thereof, or a combination thereof. It is believed that these metals can be used in a downhole environment and can be corroded by the corrosive agent.

Additionally, the downhole CEM article can include other corrodible metals, metal oxides, composites, soluble glasses, and the like. Useful corrodible materials dissolve under an aqueous condition. According to an embodiment, alloying or trace elements can be included in varying amounts to adjust the corrosion rate of the metal. For example, four of these elements (cadmium, calcium, silver, and zinc) have to mild-to-moderate accelerating effects on corrosion rates, whereas four others (copper, cobalt, iron, and nickel) have a still greater effect on corrosion. Commercial magnesium alloys, which include different combinations of the above alloying elements, can achieve different corrosion rates and include (although not limited to), for example, those alloyed with aluminum, strontium, and manganese such as AJ62, AJ50x, AJ51x, and AJ52x alloys, and those alloyed with aluminum, zinc, and manganese such as AZ91A-E alloys.

It will be appreciated that alloys having corrosion rates greater than those of the above exemplary alloys are contemplated as being useful herein. For example, nickel has been found to be useful in decreasing the corrosion resistance (i.e., increasing the corrosion rate) of magnesium alloys when included in small amounts (i.e., less than 1% by weight). In an embodiment, the nickel content of a magnesium alloy is less than or equal to about 0.5 wt. %, specifically less than or equal to about 0.4 wt. %, and more specifically less than or equal to about 0.3 wt. %, to provide a useful corrosion rate for the corrodible downhole article. In an exemplary embodiment, magnesium particles are alloyed with about 0.25 wt. % Ni. Similar ranges are applicable to other metal alloys disclosed herein.

The above alloys are useful as a metal in the downhole article and are formed into the desired shape and size by casting, forging, machining, or a combination thereof. Alternatively, powders of the metal or the metal alloy are useful for forming part of the downhole article or the powder form of CEM can be used Such metal or metal alloy powders can have a particle size of from about 0.5 micrometers (µm) to about 400 µm, and more specifically about 10 µm to about 250 µm. The powder can be further coated using a method such as chemical vapor deposition, anodization or the like, or admixed by physical method such cryo-milling, ball milling, or the like, with a metal or metal oxide such as Al, Ni, W, Co, Cu, Fe, oxides of one of these metals, or the like. Such coated metal powders are examples of controlled electrolytic material (CEM). The CEM material can be molded or compressed into the desired shape by, for example, cold compression using an isostatic press at about 40 kilopound per square inch (kpsi) to about 80 kpsi (about 275 megapascal (MPa) to about 550 MPa), followed by forging or sintering and machining, to provide a desired shape and dimension. Alternatively, the metallic powder comprised of a core and coating may be used without further processing.

It will be understood that the metal, including CEM, will thus have any corrosion rate necessary to achieve the desired performance of the downhole article. In an embodiment, the metal (e.g., CEM material) used in the downhole article has a corrosion rate of about 0.01 $mg/cm^2/hour$ to about 20 $mg/cm^2/hour$, specifically about 0.1 $mg/cm^2/hour$ to about 15 $mg/cm^2/hour$ in, for example, an aqueous 3 wt. % KCl solution (based on the weight of the solution) at 200° F. (93° C.) and even higher in the corrosive agents disclosed herein. The corrosion rate can be adapted to be below these ranges for a particular application of the downhole article.

In an embodiment, degrading the downhole article comprises reducing the metal in the downhole article by the corrosive agent or a product of the corrosive agent. Particularly, the corrosive agent is the reducing sugar, and reducing the metal in the downhole article comprises oxidizing the reducing sugar. Alternatively, the corrosive agent is the ester. In this latter case, reducing the metal in the downhole article comprises hydrolyzing the ester to produce an organic acid and oxidizing the organic acid with concomitant reduction of the metal in the downhole article.

In a further embodiment, degrading the downhole article comprises leaching the metal from the downhole article by the corrosive agent or a product of the corrosive agent. Here, the corrosive agent is the aminocarboxylic acid. The method also includes chelating, by the aminocarboxylic acid, the metal which was leached from the downhole article.

In an embodiment, the reducing sugar comprises a monosaccharide, disaccharide, oligosaccharide, polysaccharide, a derivative thereof, or a combination thereof. Particularly, the reducing sugar can be an aldose, ulosonic acid, ketose, ulronic acid, or a combination thereof. More particularly, examples of the reducing sugar include glyceraldehyde, erythrose, threose, ribose, arabinose, xylose, lyxose, allose, altrose, glucose, mannose, gulose, idose, galactose, talose, dihydroxyacetone, erythrulose, ribulose, xylulose, psicose, fructose, sorbose, tagatose, glucoronic acid, galacturonic acid, cellobiose, maltose, lactose, melibiose, maltulose, lactulose, isomaltose, laminaribiose, maltotriose, a derivative thereof, or a combination thereof.

As used herein, the term "monosaccharide" refers to a polyhydroxy aldehyde H—$[CHOH]_a$—CHO or polyhydroxy ketone H—$[CHOH]_b$—CO—$[CHOH]_c$—H with a, b, and c being independently three or more carbon atoms, specifically a, b, and c being independently about 3 to about 50, and more specifically a, b, and c being independently about 3 to about 25. "Monosaccharide" (as opposed to an oligosaccharide or polysaccharide) denotes a single unit, without glycosidic connection to other such units. In an embodiment, the monosaccharide includes an aldose, dialdose, aldoketose, ketose, diketose, deoxy sugar, amino sugar, and their derivatives, provided that the parent compound has a (potential) carbonyl group. As used herein, "aldose" refers to a monosaccharide with an aldehydic carbonyl or potential aldehydic carbonyl group. As used herein, "ketose" refers to a ketonic carbonyl or potential ketonic carbonyl group. As used herein, the term "potential aldehydic carbonyl group" refers to the hemiacetal group arising from ring closure of the monosaccharide. Likewise, as used herein, the term "potential ketonic carbonyl group" refers to the hemiketal structure. As used herein, "dialdose" refers to a monosaccharide containing two (potential) aldehydic carbonyl groups. As used herein, "diketose" refers to a monosaccharide containing two (potential) ketonic carbonyl groups. As used herein, "ketoaldose" refers to a monosaccharide containing a (potential) aldehydic group and a (potential) ketonic group. It is noted that use of parenthesis around the word "potential" indicates that the group may be present or potentially present in the reducing sugar. As used herein, "deoxy sugar" refers to a monosaccharide in which an alcoholic hydroxy group has been replaced by a hydrogen atom, except at the anomeric carbon. As used herein, "amino sugar" refers to a monosaccharide in which an alcoholic hydroxy group has been replaced by an amino group. As used herein, "uronic acid" refers to a monocarboxylic acid derived from an aldose by replacement of the $CH_2OH$ group with a carboxy group. As used herein, "ulosonic acid" refers to a carboxylic acid derived from a ketose by replacement of the C1-hydroxyl group with a carboxy group.

As discussed above, the reducing sugar can be a monosaccharide, disaccharide, oligosaccharide, polysaccharide, or a combination thereof, including derivatives thereof. The disaccharide, oligosaccharide, polysaccharide, and their derivatives have a reducing sugar end group. Further, both the D- and L-stereoisomers of the reducing sugar can be employed herein.

The reducing sugar can be a straight chain, cyclic configuration, or a combination thereof. In general, a temperature-dependent equilibrium exists between the straight and cyclic configurations of the reducing sugar. As will be appreciated by one skilled in the art, as the straight chain form of a reducing sugar is oxidized during the reduction of the metal in the downhole article, more straight chain form is produced from the cyclic form of the reducing sugar in accordance with Le Chatelier's principle.

The reducing sugar can be substituted if such substituted reducing sugar does not adversely interfere with removal of the metal from the downhole article. As used herein, the term "substituted reducing sugar" refers to a reducing sugar in which one or more hydrogen atoms in hydroxyl groups of the reducing sugar, other than the carbonyl carbon that is to be reduced in concert with reduction of the metal in the downhole article, are replaced by various functional groups. Examples of substituted reducing sugars include phosphate-containing reducing sugars such as ribose-5-phosphate, ribose-3-phosphate, arabinose5-phosphate, arabinose-3-phosphate, glyceraldehyde-3phosphate, and arabinose-3,5-diphosphate; acetylated reducing sugars such as 3,5-di-O-acetyl-D-ribose; and 5-O-benzoyl-D-arabinose. Examples of functional groups include phosphate, acetyl, hydrogen, alkyl, alkoxy, fluoroalkyl, cycloalkyl, heterocycloalkyl, cycloalkyloxy, aryl, aralkyl, aryloxy, aralkyloxy, heteroaryl, heteroaralkyl, alkenyl, alkynyl, $NH_2$, amine, alkyleneamine, aryleneamine, alkenyleneamine, and a combination thereof.

The amount of the reducing sugar in the composition is that amount required to sufficiently reduce the metal in the downhole article, thus degrading the downhole article. Factors including the exposure time, the concentration of other ingredients in the composition, volumetric flow rate at the downhole article, and the formation temperature as well as other considerations known to those skilled in the art may guide the decision of the amount of the reducing sugar to include in the composition. In an embodiment, the reducing sugar is present in the composition in an amount from about 0.1 weight percent (wt. %) to about 50 wt. %, specifically from about 0.2 wt. % to about 30 wt. %, and more specifically about 0.5 wt. % to about 25 wt. %, based on the weight of the composition.

In an embodiment, the corrosive agent is the ester. The ester hydrolyzes to produce an organic acid. The organic acid can decrease the pH of the composition proximate to the downhole article. Without wishing to be bound by theory, it is believed that reduction of the pH in the downhole environment by the organic acid can aid reductive removal of the metal from the downhole article. In this way, the downhole article may be degraded by the ester.

According to an embodiment, the ester is any ester that produces an organic acid that interacts with metal in the downhole article to degrade the downhole article. More particularly, degradation of the downhole article occurs by reduction of the metal by the organic acid produced by the ester, for example by hydrolysis of the ester. The ester can be a C2 to C32 ester, a derivative thereof, or a combination thereof. Examples of a C2 to C4 ester include methyl formate, methyl acetate, ethyl formate, dimethyl carbonate, vinyl acetate, methyl acrylate, propylene carbonate, dimethyl oxalate, ethyl acetate, isopropyl formate, methyl propanoate, and propyl formate.

Examples of C5 and C6 esters include ethyl acrylate, methyl methacrylate, vinyl propanoate, dimethyl malonate, butyl formate, ethyl propanoate, isopropyl acetate, methyl butyrate, methyl isobutyrate, 2-methylpropyl formate, propyl acetate, diethyl carbonate, 2-methoxyethyl acetate, 2-ethoxyethyl acetate, dimethyl maleate, 1-methyl-2-propenyl acetate, ethyl acetoacetate, diethyl oxalate, dimethyl succinate, 1,1-ethanediol diacetate, 1,2-ethanediol diacetate, butyl acetate, sec-butyl acetate, tert-butyl acetate, ethyl butyrate, ethyl isobutyrate, isobutyl acetate, isopentyl formate, methyl trimethylacetate, methyl valerate, pentyl formate, propyl propanoate, and 2-ethoxyethanol acetate.

Examples of C7 to C9 esters include butyl propanoate, ethyl isovalerate, ethyl 2-methylbutyrate, ethyl trimethylacetate, ethyl valerate, formic acid hexyl ester, isobutyl propanoate, isopentyl acetate, isopropyl butyrate, 1-methylbutyl acetate, methyl hexanoate, pentyl acetate, propyl butyrate, butyl lactate, 3-methoxybutyl acetate, benzyl formate, methyl benzoate, phenyl acetate, methyl salicylate, diethyl maleate, butyl methacrylate, cyclohexyl acetate, isobutyl methacrylate, 2,3-butanediol diacetate, diethyl methylmalonate, diethyl succinate, dimethyl adipate, butyl butyrate, butyl isobutyrate, ethylbutyl acetate, ethyl hexanoate, heptyl formate, 2-hexanol acetate, hexyl acetate, sec-hexyl acetate, isobutyl isobutyrate, isopentyl propanoate, methyl heptanoate, pentyl propanoate, benzyl acetate, ethyl benzoate, ethyl salicylate, 1,2,3-propanetriol triacetate, cyclohexyl propionate, diethyl glutarate, butyl valerate, ethyl heptylate, heptyl acetate, hexyl propanoate, isopentyl butanoate, methyl caprylate, octyl formate, and pentyl butyrate.

Examples of C10 to C32 esters include triethylcitrate, dimethyl phthalate, cyclohexyl butyrate, diethyl adipate, ethylene glycol dibutyrate, ethyl caprylate, 2-ethylhexyl acetate, hexyl butyrate, hexyl isobutyrate, nonyl formate, methyl nonanoate, octyl acetate, butoxyethoxyethyl acetate, diethyl heptanedioate, ethyl nonanoate, heptyl butyrate, isononyl acetate, methyl decanoate, ethyl decanoate, and 1-ascorbyl palmitate.

In a specific embodiment, the ester is ethyl acetate, 2-ethoxyethyl acetate, ethyl acetoacetate, triethylcitrate, methyl benzoate, dimethyl phthalate, a derivative thereof, or a combination thereof.

The amount of ester used is that amount required to reduce the metal in the downhole article. As with the reducing sugar, the amount of the ester used depends on factors such as the injection time desired, the concentration of other ingredients in the composition, volumetric flow rate at the downhole article, formation temperature, and other factors. The ester is preferably present in the composition in an amount from about 0.1 weight percent (wt. %) to about 40 wt. %, specifically from about 0.2 wt. % to about 20 wt. %, and more specifically about 0.5 wt. % to about 15 wt. %, based on the weight of the composition.

In an embodiment, a low molecular weight ester is used. Generally, the higher the molecular weight of the ester, the less water soluble the ester. As a result, lower molecular weight esters may be more convenient and/or more efficacious to use. The molecular weight of the ester can be from about 60 g/mol to about 1000 g/mol, specifically about 60 g/mol to about 500 g/mol, and more specifically about 60 g/mol to about 300 g/mol.

As discussed above, the corrosive agent can be the aminocarboxylic acid. In an embodiment, degrading the downhole article comprises leaching the metal from the downhole article by the corrosive agent or a product of the corrosive agent. Here, the corrosive agent is the aminocarboxylic acid that leaches and/or chelates the leached metal from the downhole article.

In an embodiment, the aminocarboxylic acid is a C1 to C35 and N1 to N10 aminocarboxylic acid. Examples of the aminocarboxylic acid include diethylenetriaminepentaacetic acid (DTPA); ethylenediaminetetraacetic acid (EDTA); ethylene-bis(oxyethylenenitrilo)tetraacetic acid (EGTA); N,N'-di(2-hydroxybenzyl)ethylenediamine-N,N'-diacetic acid (HBED); (hydroxyethyl)ethylenediaminetriacetic acid (HEDTA); iminodiacetic acid (IDA); nitrilotriacetic acid (NTA); a derivative thereof; a salt thereof; or a combination thereof. Salts of the aminocarboxylic acid include, for example, calcium disodium EDTA, diammonium EDTA, dipotassium EDTA, disodium EDTA, triethanolamine salt of EDTA (TEA-EDTA), tetrasodium EDTA, tripotassium EDTA, trisodium EDTA, and trisodium HEDTA.

In a specific embodiment, the aminocarboxylic acid is EDTA, Na$_4$EDTA, (NH$_4$)$_2$H$_2$EDTA, NTA, Na$_3$NTA, HEDTA, Na$_3$HEDTA, DTPA, K$_5$DTPA, a derivative thereof, or a combination thereof and the like.

The amount of aminocarboxylic acid used is that amount required to leach and/or chelate the metal in the downhole article. As with the reducing sugar, the amount of the aminocarboxylic acid used depends on factors such as the injection time desired, concentration of other ingredients in the composition, volumetric flow rate at the downhole article, formation temperature, and other factors. The aminocarboxylic acid is preferably present in the composition in an amount from about 0.1 wt. % to about 40 wt. %, specifically from about 0.2 wt. % to about 30 wt. %, and more specifically about 0.5 wt. % to about 20 wt. %, based on the weight of the composition.

In an embodiment, the aminocarboxylic acid has a leaching rate of the metal in the downhole article from about 0.1 mg/hour to about 2000 mg/hour, specifically about 1 mg/hour to about 1000 mg/hour, and more specifically about 10 mg/hour to about 500 mg/hour.

In another embodiment, a method for degrading a downhole article comprises introducing a composition comprising a reducing sugar, ester, aminocarboxylic acid, or combination thereof into a borehole; and removing, by the composition, a metal from the downhole article to degrade the downhole article. The method further comprises oxidizing the reducing sugar, wherein removing the metal comprises reducing the metal in the downhole article by the reducing sugar. In another embodiment, the method further comprises hydrolyzing the ester to an organic acid; and adjusting, with the organic acid, the pH of the borehole proximate to the downhole article to a pH from about 2 to about 8, more specifically about 3 to about 7, and more specifically about 4 to about 6. According to an embodiment, removing the metal from the downhole article comprises leaching the metal from the downhole article by the aminocarboxylic acid; and chelating the metal by the aminocarboxylic acid.

In an embodiment, the composition described above includes water, salt, a corrosive agent, optionally surfactant, optionally solvent, or a combination thereof.

In an embodiment, the composition includes water or brine. The selection of the water and salanity of the brine can depend on a desired density for the composition. In an embodiment, the water or brine is present in the composition in an amount from about 1 wt. % to about 99 wt. %, specifically about 10 wt. % to about 90 wt. %, and more specifically about 20 wt. % to about 80 wt. %.

Brine can be included in the foregoing compositions to modify the density of the composition as well as moderate the corrosion rate of the metal in the downhole article. In an embodiment, the salt in the brine is NaCl, KCl, NaBr, MgCl$_2$, CaCl$_2$, CaBr$_2$, ZnBr$_2$, NH$_4$Cl, sodium formate, cesium formate, and the like. The salt can be present in the composition in an amount from about 0.5 wt. % to about 50 wt. %, specifically about 1 wt. % to about 40 wt. %, and more specifically about 1 wt. % to about 25 wt. %, based on the weight of the composition.

The surfactant can be anionic, cationic, zwitterionic, or non-ionic. The surfactant can be present in the composition in an amount from about 0.05 wt. % to about 50 wt. %, specifically about 0.1 wt. % to about 40 wt. %, and more specifically about 1 wt. % to about 25 wt. %, based on the weight of the composition.

The solvent is not particularly limited as long as the corrosive agent is miscible therein to an appreciable extent. In an embodiment, the solvent can contain oxygen and be, for example, an alcohol, glycol, ether, pyrrolidone, and the like. The solvent can be present in the composition in an amount from about 0.05 wt. % to about 90 wt. %, specifically about 0.1 wt. % to about 80 wt. %, and more specifically about 1 wt. % to about 50 wt. %, based on the weight of the composition.

In a specific embodiment, the composition includes about 20 wt. % fructose, based on the weight of the composition. In another embodiment, the composition includes about 2 wt. % CaBr$_2$ and about 10 wt. % glucose, based on the weight of the composition. In another embodiment, the composition includes about 0.6 wt. % ethyl acetoacetate, based on the weight of the composition. Alternatively, the composition includes about 15 wt. % (NH$_4$)$_2$H$_2$EDTA, based on the weight of the composition. Alternatively, the composition includes about 5 wt. % KCl and about 10 wt. % K$_5$DTPA, based on the weight of the composition.

In addition to the corrosion agents discussed above, the composition can include an additive. Examples of the additive include mineral acid, additional organic acid, biocide, breaker, clay stabilizer, corrosion inhibitor, crosslinker, friction reducer, gelling agent, iron control agent, scale inhibitor, additional surfactant, or a combination thereof. Such additives are thought to, for example, facilitate entry into rock formations, kill bacteria and reduce risk of fouling, stabilize clay, provide well maintenance, facilitate proppant entry, improve surface pressure, provide proppant placement, prevent precipitation, and reduce fluid tension of the composition. In an embodiment, the additive is hydrochloric acid, glutaraldehyde, 2,2-dibromo-3-nitrilopropionamide, peroxodisulfates, salt (for example, tetramethylammonium chloride), methanol, potassium hydroxide, sodium acrylate, polyacrylamide, guar gum, citric acid, thioglycolic acid, ethylene glycol, polyacrylate, isopropanol, or a combination thereof.

In the above embodiments, the viscosity of the composition can be about 1 centipoise (cp) to about 1000 cp, specifically about 1 cp to about 100 cp, and more specifically about 1 cp to about 50 cp, as measured, for example, by a Brookfield viscometer. Additionally, in some embodiments, the time for degradation of the downhole article by the corrosive agent is from about 0.1 hours to about 300 hours, specifically about 0.1 hours to about 100 hours, and more specifically about 0.1 hours to about 48 hours. Degradation of the downhole article according to embodiments discussed above can occur at a temperature of about 20° C. to about 200° C., specifically about 30° C. to about 175° C., and more specifically about 35° C. to about 150° C.

In some embodiments, the downhole article is a downhole tool. Examples of downhole tools include a packer element, a blowout preventer element, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or other downhole elements. According to an embodiment, the downhole article is a component, for example, a ball or ball seat in a valve, flapper valve, or plunger in a solenoid. In yet another embodiment, the downhole article is a degradable metallic particle such as a proppant, which either totally degrades to be removed or degrades partially to be left as a porous structural element.

In a particular embodiment, the downhole article is a proppant particle mixed with conventional proppant that is oxidized by a reducing agent to provide an enhanced porous media after removal of the oxidized metallic particles, and the pores therein allow increased fluid to flow through the proppant pack. Such downhole tools, components, and articles contain controlled electrolytic material (CEM) material and are degradable with respect to the reducing agents herein.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed, but that the invention will include all embodiments falling within the scope of the claims. Also, in the drawings and the description, there have been disclosed exemplary embodiments, and, although specific terms may have been employed, they are unless otherwise stated used in a generic and descriptive sense only and not for purposes of limitation, the scope of the invention therefore not being so limited.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method for degrading a downhole article, comprising:
    exposing the downhole article to a composition comprising a corrosive agent selected from an ester or a combination of the ester with an aminocarboxylic acid, the downhole article comprising a magnesium alloy, the magnesium alloy comprising magnesium alloyed with one or more of the following: cadmium; silver; zinc; copper; cobalt; iron; nickel; strontium; or manganese;
    hydrolyzing the ester to an organic acid;
    adjusting, with the organic acid, the pH of the borehole proximate to the downhole article to a pH of about 4 to about 8; and
    contacting the downhole article with the organic acid to degrade the downhole article,
    wherein the composition is substantially free of acids other than the organic acid.

2. The method of claim 1, wherein degrading the downhole article comprises reducing magnesium in the downhole article by the corrosive agent or a product of the corrosive agent.

3. The method of claim 2, wherein the corrosive agent is the ester.

4. The method of claim 1,
further comprising oxidizing the organic acid.

5. The method of claim 4, wherein the ester is a C2 to C32 ester.

6. The method of claim 5, wherein the C2 to C32 ester is selected from methyl formate, methyl trichloroacetate, methyl dichloroacetate, methyl chloroacetate, methyl acetate, ethyl formate, dimethyl carbonate, vinyl acetate, methyl acrylate, propylene carbonate, dimethyl oxalate, 2-bromoethyl acetate, ethyl chloroacetate, methyl 2-chloroacetate, ethyl acetate, isopropyl formate, methyl propanoate, propyl formate, ethyl acrylate, methyl methacrylate, vinyl propanoate, dimethyl malonate, methyl 4-chlorobutyrate, butyl formate, ethyl propanoate, isopropyl acetate, methyl butyrate, methyl isobutyrate, 2-methylpropyl formate, propyl acetate, diethyl carbonate, 2-methoxyethyl acetate, 2-ethoxyethyl acetate, dimethyl maleate, 1-methyl-2 propenyl acetate, ethyl acetoacetate, diethyl oxalate, dimethyl succinate, 1,1-ethanediol diacetate, 1,2-ethanediol diacetate, butyl acetate, sec-butyl acetate, tert-butyl acetate, ethyl butyrate, ethyl isobutyrate, isobutyl acetate, isopentyl formate, methyl trimethylacetate, methyl valerate, pentyl formate, propyl propanoate, 2-ethoxyethanol acetate, butyl propanoate, ethyl isovalerate, ethyl 2-methylbutyrate, ethyl trimethylacetate, ethyl valerate, formic acid hexyl ester, isobutyl propanoate, isopentyl acetate, isopropyl butyrate, 1-methylbutyl acetate, methyl hexanoate, pentyl acetate, propyl butyrate, butyl lactate, 3-methoxybutyl acetate, benzyl formate, methyl benzoate, phenyl acetate, methyl salicylate, diethyl maleate, butyl methacrylate, cyclohexyl acetate, isobutyl methacrylate, 2,3-butanediol diacetate, diethyl methylmalonate, diethyl succinate, dimethyl adipate, butyl butyrate, butyl isobutyrate, ethylbutyl acetate, ethyl hexanoate, heptyl formate, 2-hexanol acetate, hexyl acetate, sec-hexyl acetate, isobutyl isobutyrate, isopentyl propanoate, methyl heptanoate, pentyl propanoate, benzyl acetate, ethyl benzoate, ethyl salicylate, 1,2,3-propanetriol triacetate, cyclohexyl propionate, diethyl glutarate, butyl valerate, ethyl heptylate, heptyl acetate, hexyl propanoate, isopentyl butanoate, methyl caprylate, octyl formate, pentyl butyrate, methyl dibutylphosphinate, dibutyl methylphosphonate, triethylcitrate, dimethyl phthalate, cyclohexyl butyrate, diethyl adipate, ethylene glycol dibutyrate, ethyl caprylate, 2-ethylhexyl acetate, hexyl butyrate, hexyl isobutyrate, nonyl formate, methyl nonanoate, octyl acetate, butoxyethoxyethyl acetate, ethyl dibutylphosphinate, butyl dipropylphosphinate, dibutyl ethylphosphonate, diethyl heptanedioate, ethyl nonanoate, heptyl butyrate, isononyl acetate, methyl decanoate, propyl dibutylphosphinate, dibutyl propylphosphonate, diethyl phthalate, diethyl phthalate, diethyl suberate, ethyl decanoate, butyl dibutylphosphinate, dibutyl butylphosphonate, tributyl phosphate, phenyl salicylate, diethyl nonanedioate, dipropyl phthalate, diallyl phthalate, diethyl decanedioate, dibutyl phthalate, diisobutyl phthalate, dipentyl phthalate, butyl benzyl phthalate, diphenyl phthalate, di(2-ethylhexyl) isophthalate phthalate, butyl octyl phthalate, 1-ascorbyl palmitate, di(2-ethylhexyl) phthalate, dinonyl phthalate, quinine salicylate, di-n-decyl phthalate, didodecyl phthalate, a derivative thereof, or a combination thereof.

7. The method of claim 1, wherein degrading the downhole article comprises leaching magnesium from the downhole article by the corrosive agent or a product of the corrosive agent.

8. The method of claim 7, wherein the corrosive agent is the combination of the ester and the aminocarboxylic acid.

9. The method of claim 8, wherein the magnesium which is leached from the downhole article is chelated by the aminocarboxylic acid.

10. The method of claim 9, wherein the aminocarboxylic acid is a C1 to C35 and N1 to N10 aminocarboxylic acid.

11. The method of claim 10, wherein the aminocarboxylic acid is selected from alanine; 1,2-bis(o-aminophenoxy)ethane-N,N,N',N'-tetraacetic acid; 1,2-diaminocyclohexane-N,N,N',N'-tetraacetic acid; 1,4,7,10,-tetraazacyclododecane-N,N',N''-triacetic acid; 2,2',2'',2'''-(1,4,7,10-tetraazacyclododecane-1,4,7,10-tetrayl)tetraacetic acid; diethylenetriaminepentaacetic acid; ethylenediamine-N,N'-bis(2-hydroxyphenylacetic acid); ethylenediaminetetraacetic acid; ethylene-bis(oxyethylenenitrilo)tetraacetic acid; 2-{6-[bis(carboxymethyl)amino]-5-(2-{2-[bis(carboxymethyl)amino]-5-methylphenoxy}ethoxy)-1-benzofuran-2-yl}-1,3-oxazole-5-carboxylic acid; N,N'-di(2-hydroxybenzyl)ethylenediamine-N,N'-diacetic acid; (hydroxyethyl)ethylenediaminetriacetic acid; 1,4,7-tris(carboxymethyl)-10-(2'-hydroxy)propyl)-1,4,7,10-tetraazocyclodecane; iminodiacetic acid; 2-[4-(bis(carboxymethyl)amino)-3-[2-[2-(bis(carboxymethyl)amino)-5-methylphenoxy]ethoxy]phenyl]-1H-indole-6-carboxylic acid; (methylimino)diacetic acid; 2,2',2''-(1,4,7-triazanonane-1,4,7-triyl)triacetic acid; nitrilotriacetic acid; 2,2',2'',2'''-(1,4,8,11-tetraazacyclotetradecane-1,4,8,11-tetrayl)tetraacetic acid; 3,6,9,12-tetrakis(carboxymethyl)-3,6,9,12-tetra-azatetradecanedioic acid; a derivative thereof; a salt thereof; or a combination thereof.

12. A method for degrading a downhole article, comprising:
introducing a composition comprising an ester or a combination of the ester with the aminocarboxylic acid into a borehole; the downhole article comprising a magnesium alloy, the magnesium comprising magnesium alloyed with one or more of the following: cadmium; silver; zinc; copper; cobalt; iron; nickel; strontium; or manganese;
hydrolyzing the ester to an organic acid;
adjusting, with the organic acid, the pH of the borehole proximate to the downhole article to a pH of about 4 to about 8; and
removing, by the organic acid, magnesium from the downhole article to degrade the downhole article,
wherein the composition is substantially free of acids other than the organic acid.

13. The method of claim 12, wherein removing the magnesium from the downhole article comprises:
leaching magnesium from the downhole article by the organic acid; and
chelating magnesium by the organic acid.

14. The method of claim 1, wherein the downhole article and the corrosive agent are selected such that the downhole article is degraded at a faster rate in the presence of the corrosive agent as compared to a brine without the corrosive agent; and further
the downhole article is degraded at a slower rate in the presence of the corrosive agent as compared to a mineral acid.

15. The method of claim 1, wherein the downhole article is a packer element, a blowout preventer element, an O-ring, a T-ring, a gasket, a sucker rod seal, a pump shaft seal, a tube seal, a valve seal, a seal for an electrical component, an insulator for an electrical component, a seal for a drilling motor, or a seal for a drilling bit.

16. The method of claim 1, wherein the downhole article is a ball or ball seat in a valve, a flapper valve, or a plunger in a solenoid.

17. The method of claim 1, wherein the downhole article is a proppant.

18. The method of claim 17, wherein the proppant is partially degraded to form a porous structural element.

19. The method of claim 1, wherein the composition further comprises a surfactant, a biocide, a breaker, a clay stabilizer, a corrosion inhibitor, a crosslinker, a friction reducer, a gelling agent, an iron control agent, a scale inhibitor, or a combination thereof.

20. The method of claim 19, wherein the surfactant is present in an amount of about 0.1 to about 40 wt. % based on the total weight of the composition.

21. The method of claim 1, wherein the viscosity of the composition is about 1 centipoise to about 100 centipoise.

22. The method of claim 1, wherein the magnesium alloy comprises greater than zero but less than about 1% of nickel.

23. The method of claim 1, wherein the magnesium alloy comprises greater than zero but less than or equal to about 0.5 wt. % of nickel.

* * * * *